Nov. 1, 1960　　　J. T. SCULLY　　　2,958,086
GRIP-SUPPORTING BATH BRUSHES
Original Filed March 24, 1953　　　3 Sheets-Sheet 1

John T. Scully
INVENTOR.

Nov. 1, 1960  J. T. SCULLY  2,958,086
GRIP-SUPPORTING BATH BRUSHES
Original Filed March 24, 1953  3 Sheets-Sheet 2

John T. Scully
INVENTOR.

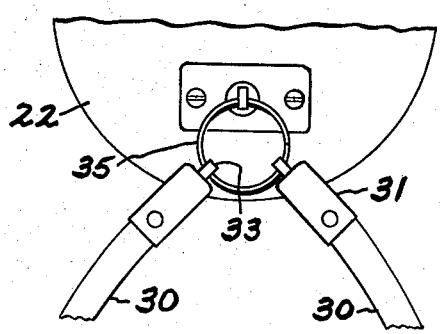
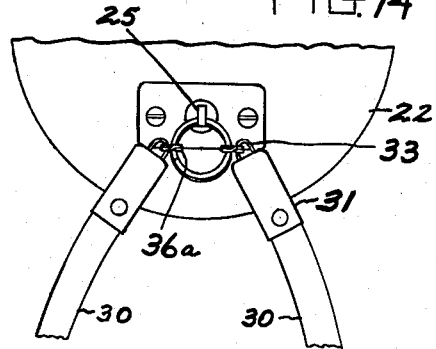
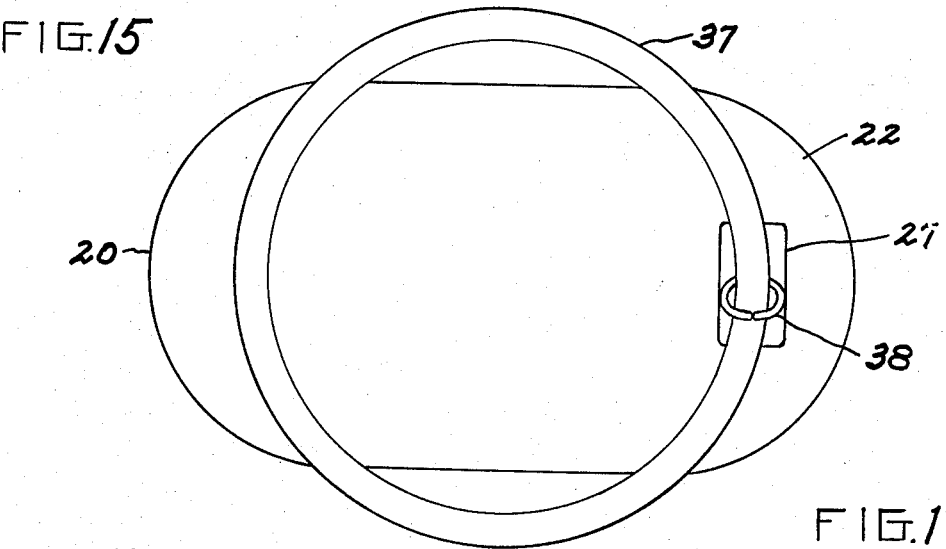
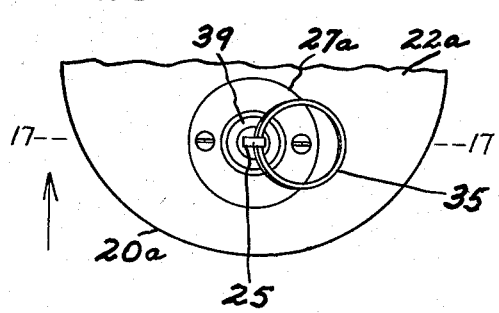
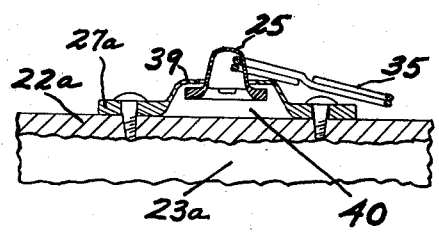

United States Patent Office 2,958,086
Patented Nov. 1, 1960

2,958,086

GRIP-SUPPORTING BATH BRUSHES

John T. Scully, 235 W. 76th St., New York 23, N.Y.

Continuation of abandoned application Ser. No. 344,320, Mar. 24, 1953. This application May 2, 1958, Ser. No. 737,468

11 Claims. (Cl. 15—143)

This invention relates to grip-supporting brushes generally and especially to grip-supporting bath brushes particularly.

This application is a continuation of my prior application for an improvement in Grip-Supporting Bath Brushes, filed on March 24, 1953, Serial Number 344,-320, date of allowance Nov. 5, 1957 and now abandoned.

The ordinary conditions under which a bath brush is used are well known to be particularly difficult because water and soap cause the instrument to become extremely slippery in the hand of a self-user of the brush. It has long been a common practice to provide a bath brush with a band strap extending substantially centrally across and over the bristle backing from one edge portion of the backing to the opposite edge portion, the band strap forming, together with the back of the backing—the side face of the backing opposite the bristled face—a loop into which the user may insert his hand, whereby the band strap will engage and support the back of the user's hand as the backing edge is gripped by the user's finger tips. It has, also, been common practice to provide a bath brush with a relatively long handle which the user may grasp to manipulate the brush on the body. In the former instance, the use of the band strap greatly limits the areas or regions of the body which can be effectively reached because the portions of the backing edge which are usually gripped by the finger tips are, in practice, those portions which constitute, relatively to the user's hand, the outermost or front limits of the brush with the result that the brush will not reach areas of the body which could not be reached by the user's finger tips. When the user's hand is withdrawn from the band loop to change his grip of the backing from a forehand to a backhand grip, the user's other hand is required to hold the brush while the change is being made, whereby, to avoid dropping the brush and injuring the ankles or feet, especially the toes, in a shower bath, both hands are simultaneously engaged with the brush with the result that neither of user's hands is available to hold a cake of soap or free to engage against a bathroom wall to steady the user's balance or free to grasp a hand rail or other suitable fixture to prevent the user's slipping or falling in shower bath or bath tub. In use of the long handle type of bath brush to reach all areas of the body, the user's elbow is frequently irritated or injured by striking against a bathroom wall or fixture and when, in order to vigorously scrub the skin, the backing proper is gripped, the long handle is apt to damage a shower bath curtain or strike against a wall or fixture and cause the brush to fall from the user's grasp to the shower bath floor, in the one instance being a nuisance and in the other a hazard to trip on or step on to upset the user or break the handle and cause one part or another to pierce and injure the user's foot.

The aforesaid limitations of the usual bath brush are, it is believed, important contributing factors in causing the well known relatively small public acceptance and use of the same and one of the aims of the present invention is to overcome the limitations of and objections to the use of a bath brush.

Among the principal objects of the invention is the provision of a bath brush wherein the bristle backing may be gripped and securely held by the user with a portion of the brush extending forwardly of the fingers of the hand to extend the user's reach for mild or vigorous scrubbing of the skin.

A further principal object is the provision of a bath brush wherein the bristle backing may be securely gripped and held to extend the user's reach with either a forehand or backhand grasp of the backing for mild or vigorous scrubbing of the skin.

A further principal object of the invention is the provision of a bath brush wherein the user may conveniently shift his grip of the brush from the forehand grasp to the backhand grasp, or vice versa, with the use of only one hand, thereby leaving the other hand free to hold a cake of soap to apply to the bristles or free to engage with a wall or fixture to support the stance of the user.

A further principal object of the invention is to provide a bath brush to fulfill the aforesaid objects with minimum, if any, opportunity for the brush to slip from the user's grasp and fall to the shower bath floor or bath tub bottom.

Further objects are to provide a generally improved bath brush; to provide a generally improved support for the brush gripping hand, which support is moisture repellant, quick drying, highly flexible in whole and in parts to be accommodated to various turnings, twistings and motions of the user's hand and wrist and arm, a support which will readily and easily receive the user's hand and, upon withdrawal of the hand, will automatically resume its initial shape to similarly readily and easily receive the user's other hand, a support of simple and durable construction, economical to manufacture, and neat and attractive in appearance and especially befitting an article for personal use, individual or public, for example in the home or in clubs, gymnasiums, schools or other institutions.

Other objects and advantages will become apparent from a consideration of the following description and claims taken in connection with the accompanying drawing, in which:

Fig. 13 is a fragmentary top view of a further modification of parts.

Fig. 14 is a similar view of a further modification of parts.

Fig. 15 is a top elevation of a further modification of parts.

Fig. 16 is a fragmentary top view, with other parts not shown, of a modification of parts shown in Figs. 3, 4, 5, 10, 11, 12, 13, 14 and 15.

Fig. 17 is an enlarged view, partly elevational and partly sectional, of the modified parts shown in Fig. 16, with the sectional view taken on the line 17—17 of Fig. 16.

Referring in more detail to the drawing in which similar reference characters refer to similar parts throughout the several views:

Figure 1:
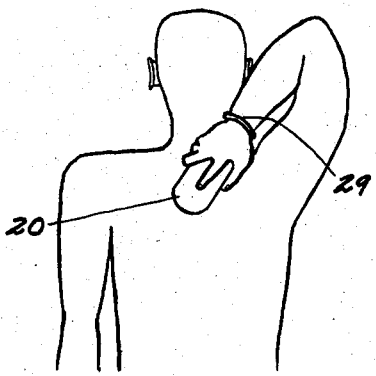
Fig. 1 is a somewhat diagrammatic illustration of one use of the invention.

In Figs. 1–5 inclusive, the bath brush, generally designated 20, comprises a formation of suitable bristles 21 which may be of natural or synthetic filament material for brushing in a wet state a person's skin. The bristles are arranged in a series of tufts secured in any well known suitable manner, as for example by staples, in sockets on one side or face of a backing 22 which may be of wood, plastic, hard rubber or other suitable material. The bristle backing 22 has an edge portion 23 which extends transversely to the direction in which the bristles project from the backing and which is adapted to be received in the user's hand in the concavity formed by the thumb and forefinger. The brush, as a whole, may have any suitable shape, for example, it may have a round or elliptical or rectangular shape. As shown herein, the brush has a generally rectangular shape, preferably, with the edge portion 23 convexly curved transversely of the bristles. The opposite end of the brush is similarly curved for symmetry of appearance and to avoid corners irritating to the user's body. In its preferred form, edge portion 23 is convexly curved cylindrically. Remote from the center of gravity of the brush and adjacent edge portion 23, the backing 22 is provided on its back or face opposite the bristled side or face with a small recess or well 24, disposed substantially symmetrically centrally widthwise of the backing, from which a rotatable or swivel loop fastening member 25 projects uprightly outwardly through an aperture 26 in a thin retaining plate 27 which is secured to the back of the backing by screws 28. Aperture 26 is large enough in diameter relatively to the loop portion of fastening member 25 to permit the latter to be freely revolved and small enough relatively to the base portion of member 25 to prevent member 25 from being drawn out of the recess 24. Disposed on the backing is a grip-supporting member, generally designated 29, comprising a flexible cord 30, preferably substantially cylindrical in cross-section and preferably of rubber, natural or synthetic. As shown herein in its preferred form, cord 30 is a black, synthetic rubber which, it is believed, is sometimes referred to in the rubber trade as "neoprene." It is stretchable, but to a considerably less degree than good quality gum rubber cord. Cord 30 has a smooth but dull surface finish which augments to some degree its natural tendency to frictionally adhere to a person's skin. Opposite ends of cord 30 are received in tubular metal caps 31 and secured therein by rivets 32 extending through the caps and cord. In caps 31 and spaced from the extreme ends of the cord ends therein are loop swivels or members 33 (similar in construction to swivels 25) which project out of the outer ends of the caps through apertures therein which are smaller in diameter than the base portions of members 33 whereby the swivels are retained from being drawn out of the caps, but are free to be rotated. Connected to members 33 are spring steel snap hooks 34 whose smaller ends are interlooped with the loop portions of members 33 for pivotal movement relatively thereto and, preferably, loosely fitted for loose or wobbly pivotal movement thereto. The larger ends of hooks 34 are connected, by interlooping, to a double coil split ring 35 of generally circular shape and made in the form of the ring which is well known as a key ring. with hooks 34 thus connected by ring 35, member 29 has a complete or full loop form and cord 30 is held resiliently flexed with the hooks, at the opposite ends of the wrist strap, initially spaced outwardly from each other and free to be slidably moved automatically inwardly towards each other on ring 35 by the weight of the brush in a fall, for example, a fall to the hanging down position or to be pivotally moved relatively to ring 35. Ring 35 is interlooped with the loop portion of swivel 25 and is pivotally movable relatively thereto and, preferably, to distribute frictional wear, the ring 35 is loosely interlooped with swivel 25 whereby it may have a limited slide movement and complete rotatable movement relative thereto. Thus, member 29 is rotatably and pivotally connected to the brush backing.

Figure 3:
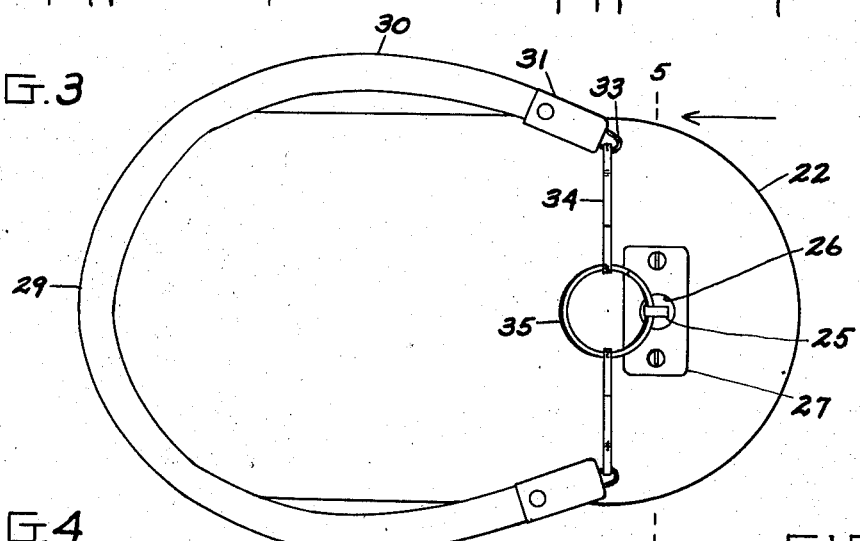
Fig. 3 is a top elevation of the bath brush.
Figure 4:
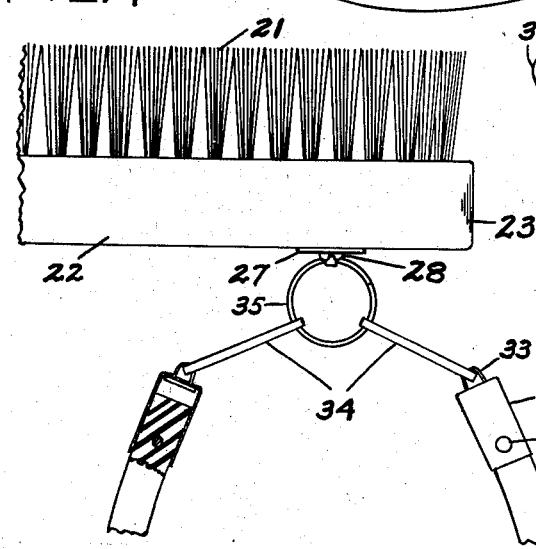
Fig. 4 is a fragmentary side elevation with the brush turned upside down to show parts in changed position relatively to other parts and with a part shown in section and another part broken away to show it in section.
Figure 5:
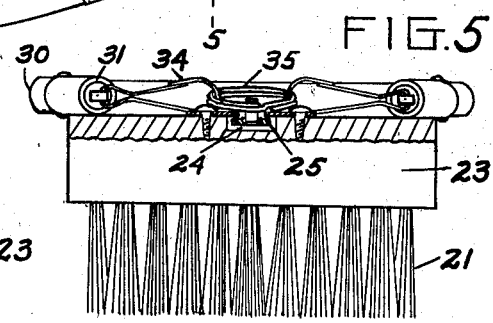
Fig. 5 is an end view partly in elevation and partly in section, the cross-sectional view being taken on line 5—5 of Fig. 3.

In Fig. 3, wherein member 29 is shown folded down upon the brush backing with cord 30 resting upon the back of the backing, it will be noted that the tension which the rubber cord is under, due to its being held resiliently flexed by ring 35, causes the hooks 34 to be automatically pulled away from each other as far as ring 35 will permit. In Fig. 4, wherein the grip-support member is shown hanging from the brush backing, it will be noted that the weight of the member further flexes it and causes the hooks to be automatically moved closer together. The shapes of member 29 will be substantially, if not identically, the same, in respectively similar positions, whether the member is in the dry or wet state or condition, since water or soap will not be absorbed by the parts. Consequently, the loop member is adapted at all times to freely receive or freely permit withdrawal of an adult user's hand without assistance from the other hand or readjustment of the cord member 30 ends whereby removal of a hand or reentry of a hand may be accomplished with the same facility when the member 29 is wet as when it is dry and, upon removal of a hand from the loop, the wrist member will spring back to its initial or normal shape for entry of one or the other of the user's hands.

Figure 6:
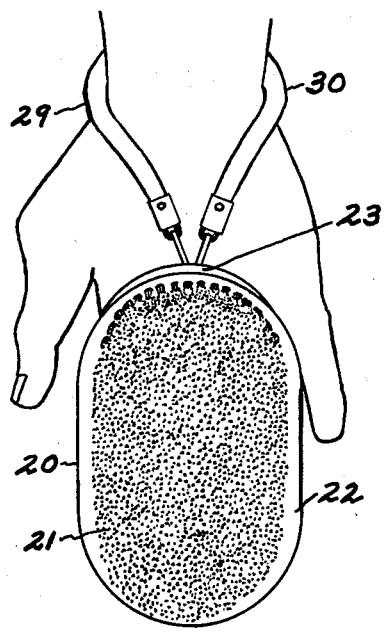
Fig. 6 is a diagrammatic illustration, on a reduced scale, of the brush suspended from the user's wrist and in position to be gripped.

In Fig. 6, it will be observed, the weight of the brush hanging supported from the user's wrist not only tautens cord 30 thereon but also causes member 29 to close together sufficiently, by being narrowed in shape whereby its sides converge to be spaced apart a distance less than the width of the hand and, preferably, less than the width of the backing, to prevent or greatly minimize fall of the brush from the user's person. It will also be observed that the converging sides of the loop member will provide a hand-supporting bridge portion of the loop member between the backing and the user's wrist. Concomitantly, it will be further observed that in this tautened condition of cord 30 the loop member 29 is preferably small enough to provide a wrist-receiving loop to hang from the back of the wrist a distance at all times shorter than the user's hand and that, consequently, the brush is disposed high enough relatively to the down stretched hand to permit convenient and easy gripping, by the fingers of the hand, of the brush backing and that the distance which member 29 extends rearwardly beyond, in the direction of the user's forearm, the inner or rear edge portion 23 of the backing causes the brush to be supported with the backing extending, or adapted to extend, up the hand beyond the outer joint of the thumb, but, preferably not beyond the inner joint, and, more preferably, slightly below the inner joint, of the thumb. Because the fastening swivel member 25 on the backing member is disposed between the center of gravity of the brush and backing edge portion 23, and adjacent the latter, the brush, as it hangs in Fig. 6, is slightly axially angular to the hand, being slightly tilted outwardly from the palm of the hand at the upper or inner end portion of the brush while its lower or outer end portion is resting against the three middle fingers of the hand. Although it will be clear that the sides of loop member 29 may be twisted upon each other to reduce, if desired, the initial size of the loop of the member, it will be understood that, from observation of Fig. 6, that the backing is in or within manipulative reach of the fingers for positioning the brush for gripping with the sides of the loop member preferably non-twisted upon each other.

Figure 7:
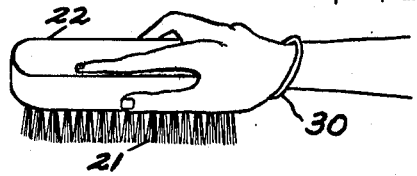
Fig. 7 is a diagrammatic illustration, on a smaller scale, of one manner in which the brush is gripped.
Figure 8:
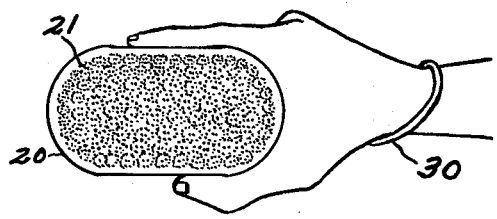
Fig. 8 is a diagrammatic illustration of another manner in which the brush is gripped, the brush being shown turned approximately ninety degrees, relatively, to the user's hand from the position shown in Fig. 7.
Figure 9:
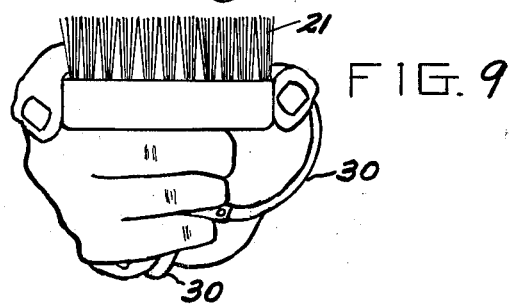
Fig. 9 is a diagrammatic illustration, on a larger scale, showing a front or forward end view of the brush gripped in the manner illustrated in Fig. 8 and with the brush and user's hand turned approximately ninety degrees.

With the brush in the preferred position to hand and fingers shown in Fig. 6, the fingers may be arranged to grip the brush according to the manner illustrated in Fig. 7, or alternatively, according to the manner illustrated in Figs. 8 and 9 and, preferably, in both instances with the cord 30 taut around the wrist and member 29 positively supporting the user's grip of the brush. Gripped in the manner shown in Fig. 7, the brush is, or tends to be forced forwardly slightly and tends to further tauten the member 29. The backing edge is gripped between the thumb and the middle and fourth fingers while the little finger is bent over one side of loop member 29 and against the palm of the hand, in which position the little finger can pull the side of member 29 which it is over and further tauten member 29 and support the grip of the brush. If desired, the fourth finger can also be bent over the same side of member 29 and between the backing and the little finger whereby both the fourth and the little fingers can pull the side of loop member 29 to further support the grip of the brush. The forefinger extends along the backing between the thumb and middle finger. This grip gives the user a very firm grasp of the brush for applying the latter, vigorously, if desired, to all the front or forepart of the body and enables the user to carry out successfully and securely a hitherto very difficult operation, the reach over one or the other shoulder to vigorously brush the upper part of the user's back in the region of the shoulder blades, as is illustrated in Fig. 1. In manipulating the brush from the position shown in Fig. 6 to the position shown in Fig. 7, the middle finger of the hand is spread apart from the forefinger and over the backing edge and is moved along the backing edge on the side opposite the thumb side of the backing edge and in the direction toward the wrist and this shifts the brush as a whole towards the thumb and also causes the outer end of the brush to swing towards the thumb side of the hand while the inner end of the brush swings toward the little finger side of the hand. With the brush in this slightly angular position, the thumb is moved downwardly against backing edge portion 23 and in the direction towards the middle finger. This downward movement of the thumb places its inner joint and the fleshy material of the thumb adjacent its inner joint against backing edge portion 23 on the side from the center of portion 23 which is adjacent the backing edge portion which the outer joint of the thumb is against (as in Fig. 7). Then, as the backing is tightly gripped by the thumb and middle finger in a squeezing action, the thumb presses, or tends to press, the brush forwardly by its pressing engagement with backing edge portion 23 while the middle finger slides slightly along, or tends to slide along, the backing edge towards the wrist, resulting in the further tautening of member 29 previously referred to.

Figure 2:
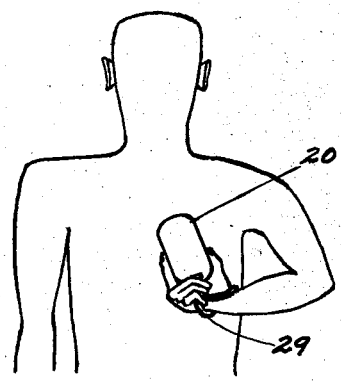
Fig. 2 is a similar illustration of another manner of use.

In manipulating the brush from the position shown in Fig. 6 to the position shown in Figs. 8 and 9, the fore- finger is moved towards the thumb side and placed along the backing edge on the thumb side and the middle, fourth and little fingers are bent towards the palm of the hand with the middle finger engaging the back of the backing, which is opposite the bristled face, and by this engagement the middle finger also supports the brush. The thumb is then moved transversely across the brush to engage the backing edge on the side of the brush opposite the side which the forefinger is engaged with. Because of the previously described relationship of backing edge portion 23, as the brush hangs in Fig. 6, to the joints of the thumb, the backing of the brush can not prevent the passage of the inner joint of the thumb across the brush behind the backing edge portion 23 which edge portion, as will be observed, is unencumbered or unobstructed to allow passage of the thumb thereacross. The movement of the thumb across the brush and its engagement with the backing along the edge thereof provides a concavity between the thumb and the forefinger of the hand which concavity receives backing edge portion 23 positioned facedly opposite the web of the hand which joins the thumb and forefinger. Because brush 20 has, in its preferred embodiment, the convexly curved transverse backing edge portion 23 and because of the previously described relationship of edge portion 23 to the joints of the thumb, as the brush hangs in Fig. 6, the grip-supporting member will support the brush with backing edge portion 23 engaged against the web of the hand between the thumb and forefinger, preferably pressed or drawn against or cushioned by the web, as shown in Fig. 8. Thus positioned, it will be observed now, upon reference to Fig. 9, that the cord portion of the grip-supporting member is partially imbedded in the fleshy part of the hand on the thumb side and also in the fleshy part of the hand on the little finger side and that the spaced sides of the loop member are taut and supporting the palm of the hand. As these fleshy parts of the hand muscularly bulge or harden, as the thumb and little finger move towards each other, in the gripping action, they further tauten cord 30 against the skin (this also occurs in the grip shown in Fig. 7). The middle and the fourth finger are then bent tightly around the grip-supporting member adjacent the brush backing, as shown, and are tightly gripping the hooks and ring thereof, using these portions substantially as a handle and also pulling on the member to further tauten it on the skin. The little finger is engaged over one of the end caps on cord 30 with the tip of the finger pressed against the palm of the hand between the end caps of cord 30. The tighter the middle, fourth and little fingers are closed or squeezed, the more the tautness of the cord is increased, or tends to be increased and, in this respect, the metal caps 31, because of their stiffness or rigidity, contribute to cause cord 30 to bind tightly against the hand and wrist as the caps are engaged and pulled sidewise by the fourth and little fingers. With the brush gripped as shown in Figs. 8 and 9 and as described in connection therewith, the user, it has been found, will have a very firm grasp of the brush for applying it, vigorously if desired, to the back of the legs and will be enable to carry out successfully and securely another hitherto very difficult operation, the reach around the back to vigorously brush it from the region of the shoulder blades down the remainder of the back, as is illustrated in Fig. 2.

In some instances, the backing edge of the brush may be provided with a cut groove extending longitudinally therewith, or with a series of transverse holes or recesses, or with any other common and suitably roughened surface, such as a serrated or knurled surface, for the fingers to grip against.

Figure 10:
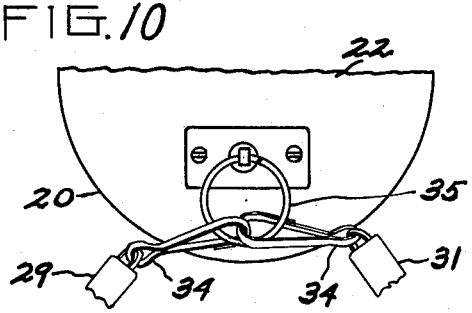
Fig. 10 is a fragmentary top elevational view illustrating an adjustment of parts.

In Fig. 10, member 29 is shown adjusted to a slightly smaller loop size by the interlooping connection of hooks 34 with each other and with each hook in interlooping connection with ring 35.

Figure 11:
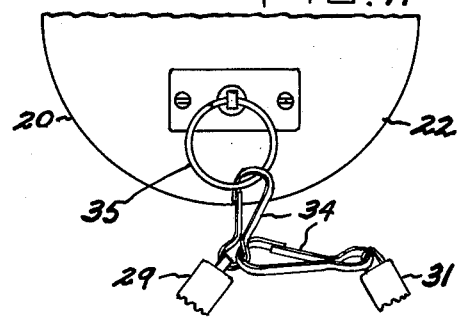
Fig. 11 is a similar view showing another adjustment of parts.

In Fig. 11, member 29 is shown adjusted as to loop size with only one hook engaging ring 35 and with the large loop end of the other hook in interlooped connection with the small loop end of the hook whose large loop end is interlooped with 35. Such an adjustment may be useful, in family use of the brush, for a child's shower bath to minimize dropping the brush.

Figure 12:
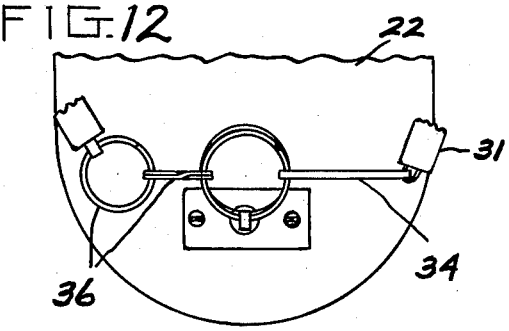
Fig. 12 is a top fragmentary view of a modification of a part.

In the modification shown in Fig. 12, a pair of interlooping spring metal rings 36, split in the manner of the common key ring, is substituted for one of the hooks; rings 36, together as shown, have a length the same as, or substantially the same as, the replaced hook, and the grip-supporting member being otherwise similar to the member shown in Figs. 3, 4, 5 and 6. The member in Fig. 12 may be adjusted similarly to the adjustment shown in Fig. 10 by interloop connection of the hook 34 with one of the rings 36 which is interlooped with the ring connecting it and the hook, or the hook may be interlooped only with one or the other of rings 36.

In the modification shown in Fig. 13, the hooks are omitted and the swivel loop members 33 in caps 31 are each interlooped directly with ring 35 for movement slidably and pivotally relative thereto. Since, with the hooks omitted, the ends of caps 31 are closely adjacent connecting ring 35, the length of the rubber cord 30 is made commensurately longer to make the member the same size as the corresponding member shown in Figs. 3, 4, 5 and 6, the structure being otherwise similar and the member in Fig. 13 assuming somewhat the general shape of a pear.

In the modification shown in Fig. 14, the connecting ring, corresponding to previously described ring 35, is smaller diametrically, but otherwise similar, and it is interlooped with two smaller key ring type rings 36a each of which is pivotally and rotatably interlooped with a loop swivel 33 in caps 31. The sizes of the rings are related to each other to make the grip-supporting member the same size as the corresponding member shown in Fig. 13 and the structure is otherwise similar.

In Fig. 15, the modified grip-supporting member shown comprises a circularly continuous rubber ring 37 of cylindrical cord shape in cross-section and interlooped with a small, single wire, strong steel circular ring 38 which, in turn, is in pivotally interlooped connection with the fastening loop swivel, not shown, retained on backing 22 by retaining plate 27 on brush 20. Ring 37 has characteristics similar to previously described cord 30 in the respects of flexibility, mild stretchability, quality, color and surface finish; all seam fins and shine or gloss, as a result of molding, are removed by passing the surface of 37 against a sharp knife edge. Together with ring 38, ring 37 will suspend the brush from the wrist with a similar relationship of brush parts to hand parts as shown in Fig. 6 and will support the brush and the user's grip thereof similarly as shown in Fig. 6 and in Figs. 8 and 9. Ring 37, being uniformly flexible throughout, does not, in use, possess desirability to the same degree as the previously described grip-supporting member parts wherein the loosely fitted interconnected pivotal and swivel parts serve to more readily and easily provide a very narrow V-shape adjacent the connecting ring when the cord is flexed and engaged on the wrist when the brush hangs normally therefrom (see Fig. 6). Since, however, there are fewer parts and, consequently, there is economy in manufacture and in assembling of the parts, this modification may be desirable for use in instances where replacement of the bath brush may be necessary unusually frequently because of repeated, hard, rough and, in some instances, abusive daily use, as, for example, usage in gymnasiums, schools, clubs and other institutions.

In the modification of parts shown in Figs. 16 and 17, instead of providing the brush backing 22a with a recess or well receiving the swivel loop member 25, the retaining plate 27a, herein shown as of generally circular shape, is centrally bulged upwardly as at 39, by a stamping and drawing operation in manufacture, thus providing a generally circular recess or well 40 in the retaining plate, which recess or well receives loop swivel 25. Brush 20a is, in other respects, similar to brush 20 and this retaining plate construction and swivel loop arrangement may be employed to secure any of the grip-supporting members previously shown and described herein to the brush backing. In the case of the grip-supporting member construction shown in Fig. 15, the ring 38 will replace ring 35 in the structure shown in Figs. 16 and 17.

All the metal parts are preferably plated for corrosion resistance with surface finish of bright nickel or chrome for appearance.

Referring again to Fig. 7, it will be understood, having Fig. 6 in view, that the converging sides of the loop member are supporting the palm of the user's hand rearwardly of backing edge portion 23 and that the palm of the hand is preferably pressing downwardly upon the sides of the loop member to further tighten the taut member on the wrist.

Referring again to Figs. 8 and 9, it will be clear that the user may, if desired, change the position of the middle finger shown in Fig. 9 by stretching it out to extend along the back of the backing so that it will point towards the forward end of the backing, that is, towards the reader, to support the backing and, further, if desired, the fourth and little fingers may be similarly stretched out whereby the tips of the latter fingers will engage and support the backing.

While I have described several embodiments of my invention, it is to be understood that they are for purposes of illustration rather than limitation and that the scope of my invention is to be determined by the claims herein.

Having described the invention, I presently claim:

1. A bath brush including a backing provided with a bristled face, grippable side edges on the backing on opposite sides thereof, a backing edge portion rearwardly disposed on the backing in a plane between said side edges thereof and receivable in the hand of the brush user opposite the palm of said hand, a grip-supporting, flexible, wrist loop member, and grip-support securing means on the backing, on only the back thereof, securing said loop member to the backing rearwardly of the center of gravity of the brush and with the sides of the loop member adjacent said means relatively close together whereby said sides of the loop member will converge closely together and be spaced apart a distance narrower than the hand as the brush hangs from the user's wrist suspended by said loop member, said loop member adapted to receive the user's wrist and to extend rearwardly of said backing edge portion a distance short enough at all times to hang the brush from the user's wrist with the sides of the loop member on opposite sides of the wrist converging in the direction towards the backing and disposed opposite the palm of the hand downstretched and with the backing within manipulative reach of the fingers of said hand downstretched whereby the backing may be gripped with the loop member supporting the palm of said hand rearwardly of said backing edge portion.

2. A bath brush including a backing provided with a bristled face, grippable side edges on the backing on opposite sides thereof, a backing edge portion convexly curved transversely of the bristles and rearwardly disposed on the backing in a plane between said side edges thereof and receivable in the hand of the user of the brush opposite the palm of said hand or, alternatively, receivable in the concavity of said hand between the thumb and forefinger thereof and facedly opposite the web therebetween of the hand, a grip-supporting, flexible, wrist loop member, and grip-support securing means on the back of the backing and on only the back thereof and engaged into the back of the backing, securing said loop member to the backing between the center of gravity of the brush and said backing edge portion and with the sides of said loop member adjacent said means relatively close together whereby said sides of the loop member will converge closely together and be spaced apart a distance narrower than the hand as the brush hangs from the user's wrist suspended by said loop member, said loop member adapted to receive the user's wrist and to extend rearwardly of said backing edge portion a distance short enough at all times to hang the brush from the user's wrist with the sides of the loop member on opposite sides of the wrist converging in the direction towards the backing and disposed opposite the palm of the hand downstretched and with the backing within manipulative reach of the fingers of said hand downstretched whereby the backing may be gripped with the loop member supporting the palm of said hand rearwardly of said backing edge portion, said backing edge portion being unobstructed to permit the user to slide his thumb transversely across said portion.

3. A bath brush including a backing provided with a bristled face, grippable side edges on the backing on opposite sides thereof, a backing edge portion convexly curved transversely of the bristles and rearwardly disposed on the backing in a plane between said side edges thereof and receivable in the hand of the user of the brush opposite the palm of said hand or, alternatively, receivable in the concavity of said hand between the thumb and forefinger thereof and facedly opposite the web therebetween of the hand, a grip-supporting, flexible, wrist loop member, and grip-support securing means on the back of the backing and on only the back thereof and engaged into the back of the backing, securing said loop member to the backing between the center of gravity of the brush and said backing edge portion and with the sides of said loop member adjacent said means relatively close together whereby said sides of the loop member will converge closely together and be spaced apart a distance narrower than the hand as the brush hangs from the user's wrist suspended by said loop member, said means disposed on said backing substantially centrally widthwise of the backing, said loop member adapted to receive the user's wrist and to extend rearwardly of said backing edge portion a distance short enough at all times to hang the brush from the user's wrist with the sides of the loop member on opposite sides of the wrist converging in the direction towards the backing and disposed opposite the palm of the hand downstretched and with the backing within manipulative reach of the fingers of said hand downstretched whereby the backing may be gripped with the loop member supporting the palm of said hand rearwardly of said backing edge portion, said backing edge portion being unobstructed to permit the user to slide his thumb transversely across said portion.

4. An oblong bath brush including a grippable backing provided with a bristled face and having an inner end, grip-support securing means on the back of the backing adjacent said inner end thereof and substantially symmetrically centrally disposed widthwise of said backing, and a resiliently flexible wrist loop member connected to said securing means for extending rearwardly of said inner end of the backing, said loop member comprising a resiliently flexible strap member arcuately flexed and held under tension with the ends of the strap member disposed adjacent the inner end of said backing and spaced outwardly from each other and with said strap ends of the strap member movable towards each other for narrowing the loop member adjacent said end of said backing.

5. An oblong bath brush including a grippable backing provided with a bristled face and having an inner end, grip-support securing means on the back of the backing adjacent said inner end thereof and substantially symmetrically centrally disposed widthwise of said backing, and a resiliently flexible wrist loop member connected to said securing means for extending rearwardly of said inner end of the backing, said loop member comprising a resiliently flexible rubber cord member arcuately flexed and held under tension with the ends of the cord member disposed adjacent the inner end of the backing and spaced outwardly from each other and with said ends of the cord member ends relatively movable towards each other for narrowing the loop member adjacent said end of said backing, the cord member being provided on its ends with relatively stiff cap members carrying relatively movable fastening members, said fastening members being connected at their outer ends by a ring member for relative slidable movement thereon.

6. An oblong bath brush including a grippable backing provided with a bristled face and having an inner end, grip-support securing means on the back of the backing adjacent said inner end thereof and substantially symmetrically centrally disposed widthwise of the backing, and a grip-supporting, flexible wrist loop member connected to said securing means for extending rearwardly of said inner end of the backing.

7. An oblong bath brush including a grippable backing provided with a bristled face and having an inner end, a backing edge on said inner end convexly curved transverse to the direction in which the bristles point, grip-support securing means on the backing on only the back thereof and disposed adjacent said inner end and substantially symmetrically centrally disposed widthwise of the backing, and a grip-supporting, flexible wrist loop member connected to said securing means for extending rearwardly of said inner end of the backing.

8. A bath brush including a backing of rigid material provided with a bristled face and oppositely disposed grippable side edges, a backing edge portion rearwardly disposed on the backing in a plane between said side edges thereof and receivable in the hand of the brush user opposite the palm of said hand, a grip-supporting flexible wrist loop member having oppositely disposed sides, and grip-support securing means engaged into the backing in only a region spaced from said bristled face and spaced rearwardly of the center of gravity of the brush and securing said loop member to the backing with those portions of said sides of said loop member at all times most closely adjacent said grip-support securing means relatively closer together than the distance of the width of an adult hand and also closer together than the distance of the width of the backing between said side edges thereof and with said side portions of said sides of the loop member spaced inwardly at all times of the planes of said grippable side edges of the backing whereby said sides of the loop member will be presented, between the backing and the wrist, converging in the direction towards the backing and spaced apart in the taut state a distance narrower than the hand adjacent the hand and narrower than the backing to provide, with said sides of the loop member in the taut state and the wrist received in the loop member, a hand-supporting bridge portion of spaced converging sides in the loop member between the backing and the user's wrist, said loop member being sufficiently large at all times and being secured to the backing sufficiently close to said backing edge portion to receive the user's wrist with the palm of the hand on said wrist facedly opposite and spaced rearwardly of said backing edge portion whereby the user may finger-grip said grippable side edges and with the palm of the hand supported by said bridge portion of spaced converging sides of the loop member.

9. A bath brush including a backing provided with a bristled face and oppositely disposed grippable side edges, a transverse backing edge portion rearwardly disposed on the backing in a plane between said side edges thereof and receivable in the hand of the brush user opposite the palm of said hand, a grip-supporting, flexible wrist loop member having oppositely disposed sides, and grip-support securing means on the back of the backing securing said loop member to the backing rearwardly of the center of gravity of the brush and with those portions of the sides of the loop member at all times most closely adjacent said grip-support securing means relatively closer together than the distance of the width of an adult hand and spaced inwardly at all times of the planes of said side edges of the backing whereby said sides of the loop member will be presented, between the backing and the wrist, converging in the direction towards the backing and spaced apart in the taut state a distance narrower than the hand adjacent the hand and narrower than the backing to provide, with said sides of the loop member in the taut state and the wrist received in the loop member, a hand-supporting bridge portion of spaced converging sides in the loop member between the backing and the user's wrist, said loop member being sufficiently large at all times and being secured to the backing sufficiently close to said transverse backing edge portion thereof to receive the user's wrist with the palm of the hand on said wrist facedly opposite and spaced rearwardly of said transverse backing edge portion whereby the user may finger-grip said grippable side edges and with the palm of the hand supported by said bridge portion of spaced converging sides of the loop member.

10. A bath brush including a grippable backing of rigid material provided with a bristled face, grip-support securing means on the backing, and a resiliently flexible wrist loop member adapted to receive the user's wrist and connected to said securing means for extending rearwardly of the backing for hanging the brush on the user's wrist to suspend the bristled backing thereon with the user's arm in the hanging down position and the hand down-stretched, said loop member comprising a resiliently flexible strap member having fastening ends, connecting means securing said fastening ends together and to said grip-support securing means and holding said strap member arcuately flexed in loop form to provide oppositely disposed sides under tension in said member with the fastening ends of said member disposed adjacent said backing and initially spaced outwardly from each other and freely slidably movable inwardly relatively towards each other and laterally of the backing on said connecting means by the weight of the brush whereby said fastening ends will be automatically moved inwardly towards each other by the weight of said brush, with the user's wrist received in the loop member, for narrowing the loop member adjacent the backing and adjacent the user's hand whereby the sides of the loop member adjacent the hand will be spaced apart a distance less than the width of the hand.

11. A bath brush as claimed in claim 8 and with said loop member in the form of a full loop and disposed completely external to said backing.

References Cited in the file of this patent

UNITED STATES PATENTS

| | | |
|---|---|---|
| 431,487 | Ryan | July 1, 1890 |
| 1,006,741 | Ferry | Oct. 24, 1911 |
| 1,260,175 | Fjimori | Mar. 19, 1918 |
| 1,386,756 | Benson | Aug. 9, 1921 |
| 1,604,435 | Wharton | Oct. 26, 1926 |
| 2,156,940 | Graham | May 2, 1939 |

FOREIGN PATENTS

| | | |
|---|---|---|
| 4,201 | Great Britain | of 1896 |
| 278,946 | Germany | Oct. 7, 1914 |